Feb. 15, 1966  N. A. CRITES  3,235,826
PRESSURE TRANSDUCER
Filed March 16, 1964

NELSON A. CRITES
*INVENTOR.*

BY
*Gray, Mase & Dunson*

United States Patent Office 3,235,826
Patented Feb. 15, 1966

3,235,826
PRESSURE TRANSDUCER
Nelson A. Crites, Columbus, Ohio, assignor, by mesne assignments, to The Battelle Development Corporation, Columbus, Ohio, a corporation of Delaware
Filed Mar. 16, 1964, Ser. No. 352,270
4 Claims. (Cl. 338—4)

This invention relates to a pressure transducer of the diaphragm type. More particularly, it concerns a subminiature pressure transducer that senses pressure normal to its active surface which is a diaphragm provided with a strain gage.

Space and weight limitations of present-day engineering products have necessitated miniaturization of not only the components of various products, but also the instrumentation required for their evaluation. The current trend toward miniaturization of over-all instrumentation systems has extended from the electrical circuitry to the mechanical aspects of transducers.

The invention is a transducer built on a subminiature scale and comprises a four-arm, etched-foil, strain-gage bridge bonded to the inside surface of a flat diaphragm which is an integral part of a thin, evacuated capsule sealed with a cover. Four wires are connected to the bridge and project through the capsule.

One advantage of the transducer of this invention is that the strain-gage bridge is arranged on the diaphragm to take maximum advantage of the strain in the diaphragm.

Another advantage of this invention is that the transducer is so small that when the transducer is placed on an object and the object is placed in a stream of moving air, it is believed that the pressure indicated by the transducer is the same as if the transducer were absent, i.e., the transducer does not interfere with the air flow pattern.

Another advantage of this invention is that the transducer produces a linear read-out (millivolts vs. pressure) throughout its full range.

Another advantage of the transducer, being less than plus or minus 3 percent error over the entrie pressure range.

Still another advantage of the transducer of this invention is the unique construction that produces a strain gage and bridge combined with enlarged areas for easy connection of the lead wires to the bridge.

Still other advantages and features of the invention will be apparent from the following description, the drawings and the claims.

Figure 1:
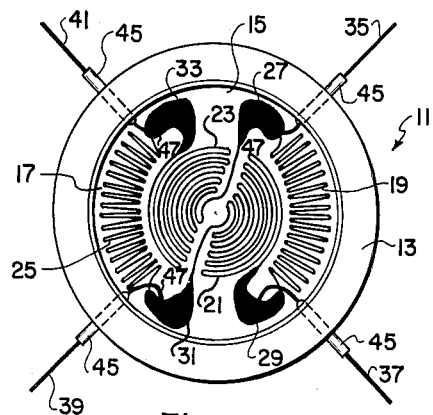
FIG. 1 is an enlarged plan view of the transducer with the cover plate removed.
Figure 2:
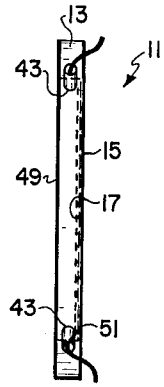
FIG. 2 is an enlarged side view of the transducer.
Figure 4:
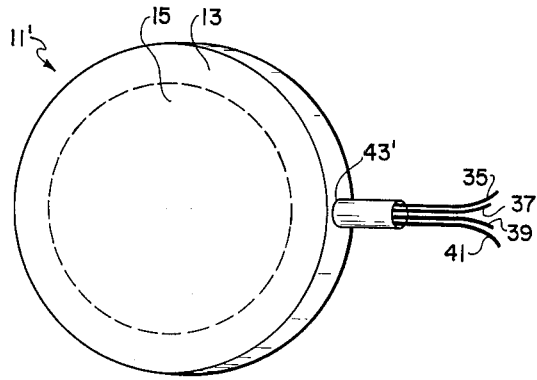
FIG. 4 is an enlarged perspective view of another embodiment of the transducer.
Figure 5:
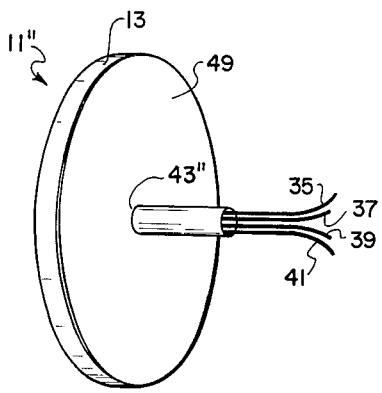
FIG. 5 is an enlarged perspective view of still another embodiment of the transducer.

Referring to FIGS. 1 and 2, the transducer 11 is constructed with the casing side or a ring 13 and diaphragm 15 in one connected piece. The strain-gage bridge 17 is attached to the diaphragm 15 and includes four elements or arms 19, 21, 23, 25 and four tabs 27, 29, 31, 33 (these features are best shown in FIG. 1). Four lead wires 35, 37, 39, 41 are soldered to the four tabs 27, 29, 31, 33, respectively. The lead wires 35, 37, 39, and 41 are each passed through a passage 43 in the casing side 13 (this may be modified according to intended use as shown in FIGS. 4 and 5). Each lead wire 35, 37, 39, and 41 is provided with a glass seal 45 along the area where it passes through passage 43 in the casing side 13. As a further precaution it is preferred that a minute amount of epoxy cement (not shown) be applied to the glass seals 45—45 to ensure sealing of the passages 43—43. Preferably the lead wires 35, 37, 39, 41 are provided with a bent portion 47 before they are soldered to the tabs 27, 29, 31, 33 so that the wires can flex when the diaphragm 15 moves. When the lead wires 35, 37, 39, 41 are connected directly to the tabs 27, 29, 31, 33 they tend to stiffen the diaphragm.

After the strain-gage bridge 17 is attached to the diaphragm 15 and the lead wires 35, 37, 39, 41 are attached, a cover plate 49 is placed on the ring 13, opposite the diaphragm 15, and sealed in place. A hole (not shown) is left in the cover plate 49 so that the chamber 51 (delineated by the ring 13, cover plate 49, and diaphragm 15), best shown in FIG. 2 can be partially evacuated. Before evacuation, the assembly is heated to 250° F. under a partial vacuum to remove moisture and other volatile materials. A vacuum of 1 micron or less is then drawn on the chamber 51 and the opening in the cover plate 49 is sealed off.

The configuration of the four-element strain gage was based on the analysis of a small, thin diaphragm. The analysis is based on the assumption that the strain gage will be mounted on the side of the diaphragm opposite to that on which the pressure acts. Any text on advanced strength of materials shows that the radial and tangential stresses in a thin flat circular plate undergoing relatively small deflections (neglecting memberane stresses and assuming the edges to be rigidly fixed from rotation) to be:

$$\sigma_r = \tfrac{3}{8} p(a/t)^2 [(3+\nu)(r/a)^2 - (1+\nu)]$$

and $$\sigma_t = \tfrac{3}{8} p(a/t)^2 [(1+3\nu)(r/a)^2 - (1+\nu)]$$

Where: $p$=pressure, $t$=thickness, $r$=radius, $a$=outside radius, and $\nu$=Poisson's ratio. Using biaxial stress-strain relations for a homogeneous isotropic material, the radial and tangential strains are:

$$\epsilon_r = (\sigma_r - \nu\sigma_t)/E = -C[3(r/a)^2 - 1]$$
$$\epsilon_t = (\sigma_t - \nu\sigma_r)/E = -C[(r/a)^2 - 1]$$

Where the constant $C$ is defined as:

$$C = \tfrac{3}{8}(1-\nu^2)p/E(a/t)^2$$

From these relationships it is noted that: (1) The radial strain is tensile out to a radius of 57.7 percent of the outside radius, where it changes from tensile to compressive. (2) In the central portion ($r/a < 0.577$), both the radial and the tangential strains are tensile, but the tangential strain is always larger. Therefore, in this region, it has been conceived that the most effective orientation for strain gage elements is tangential. (3) In the outer portion ($r/a > 0.577$), the tangential strain approaches zero and the radial strain increases. Thus, in this region, it has been conceived that radial orientation of strain gage elements is most advantageous.

From the above considerations, the diaphragm surface is divided into 4 regions, each to be nearly covered by strain elements (19, 21, 23, and 25) and each element comprising one arm of a conventional Wheatstone bridge. These four regions are two semicircles on the inner portion of the diaphragm 15 and two semicircles on the outer portion of the diaphragm 15. The resistance of the two inner elements 21 and 23 are made equal by making them symmetrical; likewise for the outer elements 19 and 25. In order to get maximum output, however, it is necessary to add the outputs of outer element 19 and inner element 21 and to add the outputs of inner element 23 and outer element 25. The strain is tensile in elements 21 and 23 and compressive in elements 19 and 25. Therefore, elements 19 and 21 are connected in adjacent arms of the bridge so that the voltage drop across them is equal to the applied voltage, similarly for elements 23 and 25. This requires the initial resistance of elements 19 and 21 (and of elements 23 and 25) to be closely matched.

The preferred method of producing the metallic strain-gage bridge 17 is by the etched-foil or printed circuit technique often used to manufacture conventional strain-gage. The entire four-arm bridge 17 is photoetched to produce one accurate unitized piece. Regions that are critical with regard to fatigue are enlarged and ample connector tabs (27, 29, 31 and 33) are provided to permit soldering the lead wires (35, 37, 39 and 41) to the gage 17.

The successful miniaturization of the pressure transducer is to be noted from an example pressure transducer constructed according to this invention. The material selected for the diaphragm 15 was a beryllium copper (BERYLCO 25 alloy) solution heat treated to full hardness from the annealed state. The diameter of the transducer being 0.250 inch, the diaphragm diameter was selected as 0.190 inch. The thickness of the diaphragm 15 was selected as 0.0025 inch based on the following considerations: (1) a thickness adequate to keep the stress level at overload pressure (1½ times maximum operating gage pressure) sufficiently below the proportional limit of the material selected; (2) a thickness sufficient to prevent deflection of the diaphragm from exceeding about one-half of its thickness over its full operating range (for this particular transducer the operating range is ±11 p.s.i.g.); and (3) a thickness small enough to provide a natural frequency of vibration that is higher than that to which the transducer will be subjected. The thickness of the transducer was 0.020 inch by making the ring (13) 0.017 high. The holes 43—43 are placed 90 degrees apart and are 0.009 inch in diameter.

The strain-gage bridge 17 was cemented in place on the diaphragm 15. A cement containing a thinner that enables an extremely thin cement line to be obtained is used to retain flexibility of the diaphragm 15. The leads (35, 37, 39 and 41) of .005 inch wire, were passed through the hole 43—43, bent 90 degrees to provide a spring effect, and then soldered to the tabs (27, 29, 31 and 33). The leads (35, 37, 39 and 41) were then sealed at the passages 43—43 where they passed through the ring 13. The cover plate (49) .003 inch thick was then soldered in place and a vacuum of 1 micron or less was drawn on the transducer through a hole in the cover plate 49 and the hole was subsequently sealed off. The evacuation is necessary in order to minimize thermal effects.

Figure 3:
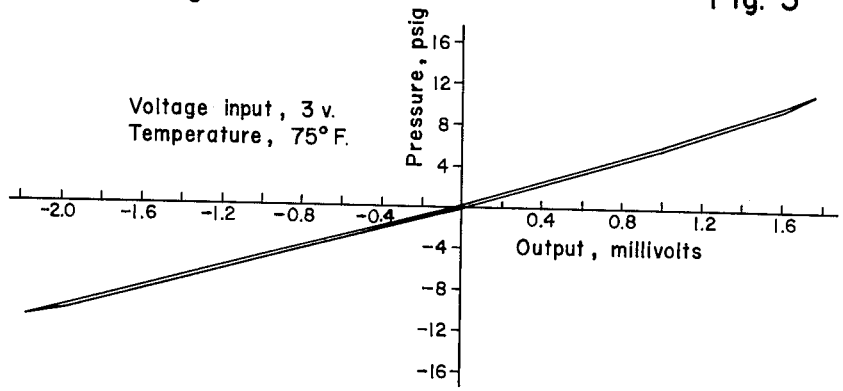
FIG. 3 is a graph showing the relationship between pressure and millivolts when the transducer is subjected to an excitation voltage of 2.70 millivolts.

The transducer described above was measured with a potentiometer, at an exciting voltage of 3 volts. FIG. 3 shows the calibration curve obtained with the transducer at room temperature conditions. The average output over the entire pressure range is 60 microvolts per volt per p.s.i. pressure change. There is a slight difference in slope between the calibration curve in the pressure and vacuum regions, however, each portion itself, being quite linear. This is probably due to the development of membrane stresses in the diaphragm 15 as a result of the large deflections, measured from the "evacuated position," associated with extreme values of pressure. In spite of this effect, the linearity, as shown in FIG. 3, over the entire range is ±2.2 percent. The transducer satisfactorily withstands overload pressures of 150 percent and operates at temperatures of −20° F. to 150° F.

FIG. 5 shows a transducer 11″ having the lead wires 35, 37, 39 and 41 projected through the ring 13 through one opening 43′ instead of four separate openings.

FIG. 5 shows a transducer 11′ having the lead wires 35, 37, 39 and 41 projected through a single opening 43″ in the cover plate 49. The embodiments of FIGS. 4 and 5 are useful where the use of the transducer does not allow the wires to project from the case in 4 different directions 90° apart.

It will be understood, of course, that while the forms of the invention shown and described constitute a preferred embodiment, it is not intended to illustrate all possible forms of the invention. It will also be understood that the words used are words of description rather than words of limitation and that various changes, such as changes in shape, size, and arrangement of parts may be made without departing from the spirit and scope of the invention herein disclosed.

What is claimed is:
1. A pressure transducer comprising:
   (a) a circular diaphragm having an integrally attached rim, said diaphragm flexing in response to pressure on the surface of said diaphragm to produce tension and compression strains in said diaphragm;
   (b) a cover plate attached to the rim of said diaphragm to form a hermetically sealed chamber between said diaphragm and said cover plate surrounded by said rim, said chamber being evacuated;
   (c) a first pair of strain gages, each comprising a strain sensitive electrical resistance element, positioned in said hermetically sealed chamber, attached to said diaphragm and covering the central area of said diaphragm out to about 58 percent of the over-all radius of said diaphragm, each strain gage of said first pair of strain gages occupying about one-half of said central area of said diaphragm and having a plurality of semicircular elements concentric with the center of said diaphragm;
   (d) a second pair of strain gages, each comprising a strain sensitive electrical resistance element, positioned in said hermetically sealed chamber, attached to said diaphragm and positioned around the outside of said first pair of strain gages, each strain gage of said second pair of strain gages having a plurality of elements arranged radially on said diaphragm;
   (e) said first and second pair of strain gages having approximately equal resistances, each strain gage being one arm of a Wheatstone bridge; and
   (f) a separate electrical conductor connected to each strain gage and passing through a wall of said hermetically sealed chamber to a location outside of said hermetically sealed chamber.

2. A pressure transducer according to claim 1 wherein said electrical conductors pass through a single opening in the rim of said diaphragm.

3. A pressure transducer according to claim 2 wherein said electrical conductors pass through a single opening in said cover plate.

4. A pressure transducer according to claim 1 wherein said electrical conductors pass through the rim of said diaphragm at points located 90° apart.

References Cited by the Examiner
UNITED STATES PATENTS

| | | | |
|---|---|---|---|
| 2,400,467 | 5/1946 | Ruge | 338—4 |
| 2,882,731 | 4/1959 | Peucker | 73—398 |

RICHARD M. WOOD, *Primary Examiner.*